Patented Oct. 16, 1951

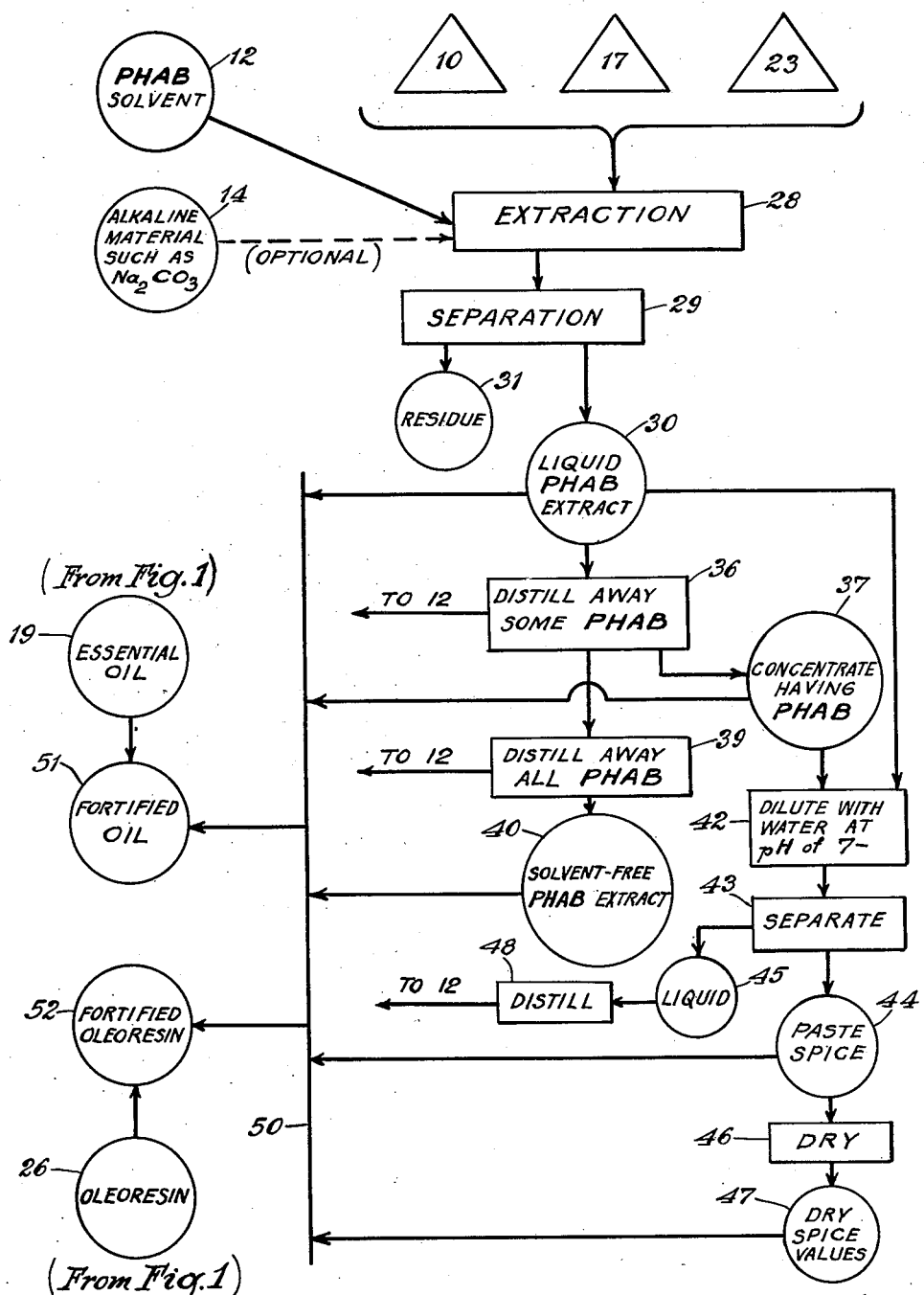

2,571,948

UNITED STATES PATENT OFFICE 2,571,948

SPICE EXTRACT AND METHOD OF PRODUCING

Louis Sair, Evergreen Park, and Lloyd A. Hall, Chicago, Ill., assignors to The Griffith Laboratories, Inc., Chicago, Ill., a corporation of Illinois Application June 28, 1950, Serial No. 170,914

11 Claims. (Cl. 99—140)

The present invention relates generally to spices and extracts thereof and in particular to a non-volatile extract of spice origin.

Essential oils of many spices are volatile and are commonly made by steam distillation of natural spices. The so-called "oleoresin" extracts of spice are commonly made by extracting the natural spice material with a suitable solvent to obtain a solvent extract and a solid residue. The solvent is chosen for its selectivity of both the essential oil content and the oleoresin content. Furthermore, the extracting solvent is chosen from those having low volatility so that the solvent may be distilled away from the extract without appreciable loss of essential oil. The oleoresin extract may be further distilled to recover an essential oil fraction, but the practice is not general. In the oleoresin extraction and in the steam distillation process there remains a solid residue which is non-volatile and which often contains flavoring ingredients and the natural coloring of the spice. Thus, it is apparent that compared to a natural spice, the essential oil of a spice lacks some content of the oleoresin, and the oleoresin extract lacks what remains in the extraction residue.

When clove, or allspice, or black pepper is the spice involved, for example, there is a strong coloring matter present in the natural spice which resists extraction by the oil-solvent which removes essential oil and oleoresins. The solvent is classified as a low-volatile solvent for fats and oils, and common ones are acetone, ethyl alcohol, tri-chlorethylene, benzene, naphtha, hexane, carbon tetrachloride, and others.

We have discovered that the natural spices contain numerous ingredients of value as flavor or color, or as antioxidants, which are not soluble in the oil-solvents used for extracting oil and oleoresins, and that such ingredients are soluble and extractable by other solvents, including in particular polyhydric aliphatic alcohols and certain of their derivatives, over a wide range of temperatures. Suitable polyhydric aliphatic alcohols are those of the lower molecular weights which are miscible with water, such as glycol, glycerol, ethylene glycol, diethylene glycol, triethylene glycol, and propylene glycol. Suitable derivatives are the mono-ethers of such polyhydric alcohols with the lower monohydric alcohols from methyl through butyl such as the mono-ethers of methyl, ethyl, propyl or butyl alcohol with ethylene glycol or diethylene glycol, or propylene glycol. The extract so obtained is referred to as the PHAB (polyhydric alcohol base) extract. For pure food products, propylene glycol is preferred, not primarily on account of its functioning, but because it is approved under current U. S. Federal regulations.

In the case of many spices the PHAB extract is highly colored, especially in the cases of spices brown in color. It provides an excellent food color which may be used alone where the attendant spice flavor is of value. Where color value is an objective it may in some cases be enhanced in the PHAB extract by rendering the material alkaline, by adding some alkaline substance before or during the extraction. The PHAB extract provides an excellent brown food color which may be used to color the oleoresin of clove or other spice oils or other food products.

In extracting natural spice to secure a concentrated extract, the volatile oil-solvent process is advantageous in permitting removal of the solvent without substantial loss of volatile content, and disadvantageous in that it leaves some spice values including color in the residue. The PHAB solvent may be used to extract said spice values as well as essential oil and oleoresin, but it is then not practicable to separate the PHAB solvent from the volatile spice elements by fractional distillation as in the case of using the low-volatile oil-solvent. Such a PHAB extract of a natural spice is a diluted or distended extract and has valuable uses as such. An important feature of the present invention is the dual extraction of natural spice, first in the conventional way to secure the oleoresin extract, then to extract the residue with a second and different solvent such as PHAB solvent, distill away the second solvent from the non-volatile extract, and add the latter to the oleoresin extract.

Because the essential oil or the oleoresin extract of any spice are each lacking in some one or more of desirable ingredients available in natural spice, the PHAB extract may be used to fortify the essential oil or the oleoresin extract of the same spice. The fortification is not limited to direct addition, however. For example, it is common to provide so-called dry soluble seasonings comprising essential oil, or oleoresin, or various mixtures of such from several spices, on salt or sugar crystals. The PHAB extract as recovered or as it may be concentrated in extractives by distillation, and whether or not obtained from natural spice, may be used as an ingredient of such a dry soluble seasoning, or of any other compounded material including spice.

The term "PHAB extract" as used in the specification and claims hereof, comprehends the PHAB solvent and its extracted spice content as recovered from the extraction with or without PHAB washings, and the same with some or all of its PHAB solvent distilled away from the extractives therein.

The term oil-less extract refers to any extract with or without its solvent, derived from a residue of spice from which the volatile oil has been removed.

It is therefore a general object of the present invention to provide various solvent extracts containing material deriving from a natural spice.

It is also an object of the present invention to fortify an essential oil or an oleoresin extract of a given natural spice with a solvent extract containing additional ingredients derived from the same kind of spice.

It is a particular object of the invention to fortify a composition containing an essential oil of a spice with a PHAB extract of a spice.

It is a particular object of the invention to fortify essential oil or oleoresin extract of spice with a PHAB extract obtained from the residue of spice from which essential oil has been removed, or from which both esential oil and oleoresin have been removed.

It is also a particular object of the invention to extract natural spice or an oil-free residue of spice with propylene glycol.

Another and important object of the invention is to extract with a PHAB solvent, with added alkaline material a natural spice or the residue of spice from which at least the essential oil has been substantially removed.

It is a particular object to practice on natural spice successive extractions first with a low-volatile solvent, and then with a PHAB solvent, to secure two extracts from each of which the solvent employed is removable without substantial loss of spice values, to provide two concentrates which may be combined.

The foregoing and other objects and advantages of the invention will become apparent from the following description of the invention as set forth in particular detail in connection with the accompanying drawings. The drawings show diagrammatically various steps of the invention including alternative procedures.

Fig. 2 represents use of natural spices or residues from Fig. 1 to procure and to use PHAB extracts, as in fortifying conventional extracts.

Figure 1:
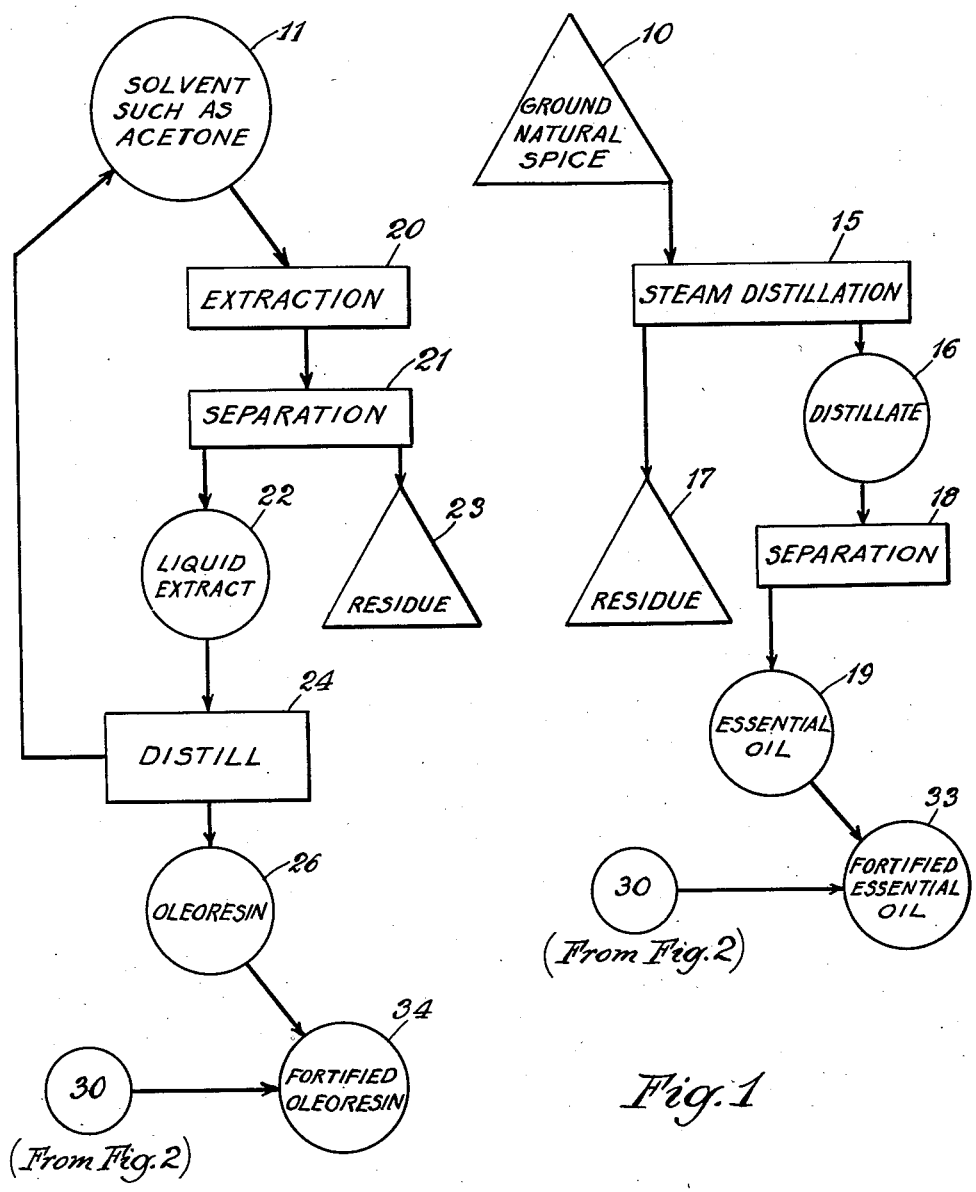
Fig. 1 illustrates conventional processing providing residues for use in the present invention, and providing conventional extracts illustrated as fortified by the new extracts of this invention.

Heretofore, essential oils have been provided in light-colored form, lacking the color characteristics of the original spice. Certain elements present in the natural spice are absent in the essential oil, notably color ingredient and non-volatile taste elements of the natural spice. The present invention contemplates adding one or more of these lacking materials to the essential oil, or to the oleoresin extract, and especially the color ingredient, where a characteristically colored spice is involved. When the process is carried out for fortifying an essential oil with color, the color content may be accompanied or not by other spice values. When the PHAB extraction is practiced on natural spice the extract will include oil and oleoresins as well as color and spice values not present in the oleoresin extract. When the PHAB extraction is practiced on spice depleted or exhausted in essential oil and oleoresins, the resulting extract is correspondingly or substantially lacking in content of such oil and oleoresins, but contains other taste elements.

The PHAB extract as recovered from the extraction, with or without its washings, may be treated in several ways. It is useful as recovered. Part or all of its PHAB solvent may be distilled away at atmospheric pressure or in vacuo. The original or reduced PHAB extract may be distended with water, with addition of an acid if necessary to adjust the pH to 7 or below, for effecting a precipitation of color values, which may be collected by a suitable procedure.

In extracting certain natural spices or such exhausted spice residues with the PHAB solvent it has been found that the color value of the extract is increased when an alkaline agent is added to the material being extracted. Caustic soda, sodium carbonate, sodium bicarbonate, trisodium phosphate, ammonia and others, either organic or inorganic, may be used. When the extract is made specially for its color value, it is accordingly preferred to use such additional agent, and preferably a sodium carbonate.

The invention is applicable to all spice materials which yield essential oils or oleoresin, including clove, allspice, black pepper, red pepper which comprehends paprika and Congo chillies, cardamon, cumin, caraway, nutmeg, mace, coriander, ginger, oregano, sage, bay, rosemary, marjoram, basil, thyme and others. When the invention is practiced to concentrate color values and minimize spicy ingredients, it provides an edible color for food products. In the case of color deriving from cloves, an excellent brown color may be obtained. There is at this time no certified food color which is brown, and the present invention provides one which may be made variously spicy in accordance with the steps employed as now described.

Numeral 10 indicates a supply of natural dry spice, preferably in ground form to facilitate solvent extraction. The triangular form indicates that it is also a raw material for the PHAB extraction.

Numeral 11 illustrates a supply of volatile solvent for extracting spice oil from the material 10. A solvent of low volatility is used so that it may be distilled away by fractionation from the extracted material at a temperature which does not result in loss of extracted essential oil.

Numeral 12 in Fig. 2 represents a supply of PHAB solvent, such as propylene glycol. The PHAB solvents have relatively high boiling points making them unsuitable as the extraction solvent 11.

Numeral 14 in Fig. 2 represents a supply of alkaline material, preferably normal sodium carbonate, as an optional ingredient in the PHAB extraction to enhance the color value of a color-containing extract of some spices.

The natural spice 10 may be steam distilled as indicated at 15 in a conventional manner to provide an aqueous distillate 16 and a spice residue 17. The distillate 16 is separated at 18 to provide water and essential oil 19.

The natural spice 10 may be extracted in a conventional manner with solvent 11 as indicated at 20 to dissolve essential oil and other ingredients, particularly oleoresins which dissolve along with the oil. Numeral 21 represents a mechanical step of separation generally included in the extracting procedure, including any washing, preferably with the same solvent, of the extraction residue, to provide a liquid extract 22 and an exhausted residue 23. The liquid extract 22 is fractionally distilled at 24, to remove the volatile solvent, which may be returned as indicated by the line 25 to the supply 11. The still residue 26 which is liquid to semi-solid, is the commercial oleoresin of the spice extracted.

The foregoing processes are conventional, and other processes are also contemplated which will yield essential oil 19 or an oleoresin 26, and which yield exhausted residues similar to residues 17 and 23. The PHAB solvent may be used to extract either fresh spice 10 or an exhausted residue, such as 17 or 23. Such spice materials contain special spice ingredients sometimes including coloring agents, not soluble in the solvent 11.

In the event that the PHAB solvent is used on fresh spice 10 it will also dissolve essential oil and oleoresin as well as any coloring matter and said special spice ingredients.

In Fig. 2 the triangles designated 10, 17 and 23, are those from Fig. 1, and represent available raw material for the PHAB solvent extraction. Numeral 28 represents extraction of any such raw material, for example with propylene glycol from supply 12. Numeral 29 represents separation and washing steps normally included in an extraction process to yield a liquid PHAB extract 30 and a residue 31. The extract may be strongly colored in certain cases. It has been found that when an alkaline agent, preferably sodium carbonate from supply 14, is added to the material being extracted at 28 in an amount up to 10% by weight of the solid content, the color value of the extract is enhanced in certain cases, especially clove and allspice, and may be thus approximately doubled. The liquid extract 30 contains spice elements, more of taste than aroma when exhausted residues 17 and 23 are used. The liquid extract 30 may be added to essential oil 19 to fortify the latter thus to provide a new spice product designated 33 in Fig. 1. Of course the PHAB solvent content in extract 30 dilutes the essential oil 19 but its spice values fortify the essential oil 19 in respect to color and in certain spice elements normally lacking in the essential oil 19. Liquid extract 30 may also be used to fortify oleoresin 26 to form new product 34 (Fig. 1).

To minimize or prevent the effective dilution of the essential oil 19 or of the oleoresin 26 with the PHAB solvent present in the liquid extract 30, the latter may be distilled to remove some or all of its PHAB content. Removal of only part of the PHAB content, indicated at 36, forms a concentrate 37 containing less PHAB than original liquid extract 30. Complete removal of the PHAB solvent may be effected by continuing the distillation 36 as indicated at 39 thereby forming a residue 40 as a solvent-free PHAB extract of the spice employed.

In the case of those liquid extracts 30 which are highly colored, as in the case of cloves, allspice and black pepper, the liquid extract 30 or its concentrate 37 may be diluted with water as indicated at 42 at a pH of 7 or less to effect a precipitate which includes the color value of the original extract 30. The precipitate is then separated as indicated at 43 forming a colored pasty spice product 44 and an aqueous filtrate 45. The paste 44 may be dried at 46 forming a dry spice color 47.

From the distillation 36 and 39, the distillate of PHAB may be returned to the PHAB supply 12. Likewise, the aqueous filtrate 45 may be distilled at 48 to recover the PHAB content for the supply 12.

The foregoing processing provides one or more of the following: liquid extract 30, its concentrate 37, its solvent-free content 40, paste 44, and dry spice color 47. Each one of these may be used as a PHAB extract designated by the single vertical line 50 to fortify essential oil 19 or oleoresin 26 to form various fortified essential oils 51 and various fortified oleoresins 52, all as new spice products for the present invention.

In general, the extraction is carried out at temperatures elevated above 212° F. up to 340° F., by an infusion process which may vary in time, preferably from 1 to 2 hours. At the extremes of the temperature range, the result in two hours, as measured in terms of color value, is but a little better than secured in one hour, but at the intermediate part of the temperature range from about 260° F. to about 300° F. the color value in two hours is better than in one hour.

In the case of exhausted black pepper from an oleoresin extraction process, the addition of 1.5 parts of various alkalis to 100 parts of the pepper extracted, has little effect in increasing color. But where natural clove is so treated, the color value is considerably enhanced and better in the case of an alkali metal carbonate than in the case of sodium hydroxide.

The following Table I shows the color values, all brown, attained in extracting exhausted pepper from an oleoresin extraction, at 260° F. for one hour, using 100 grams of the pepper residue and 200 milliliters of a polyhydric alcohol or monoether thereof. In the case of monoethers, any hydrolysis which may take place due to alkalinity, merely provides the polyhydric alcohol base without adverse effect on the process.

Color value of an extract as used in this specification is determined by diluting a specified weight of the extract to 25 ml. with propylene glycol and reading the value on a Fisher Electrophotometer using the 525 B filter.

Table I

| Item | Solvent | Color Value of Extract (0.2 gms. of Extract in 25 ml. Propylene Glycol |
| --- | --- | --- |
| 1 | Propylene glycol | 42 |
| 2 | Ethylene glycol | 54 |
| 3 | Glycerin | 37 |
| 4 | Diethylene glycol mono-methyl ether | 34 |
| 5 | Diethylene glycol mono-ethyl ether | 30 |
| 6 | Ethylene glycol mono-methyl ether | 28 |
| 7 | Ethylene glycol mono-ethyl ether | 22 |
| 8 | Diethylene glycol mono-butyl ether | 10 |

Table II illustrates the extraction of numerous natural spices with propylene glycol, using 100 grams of the spice with 200 ml. of the solvent, and 1.5 grams of sodium bicarbonate, for 1 hour at 300° F.

Table II

| Item | Spice | Color of Extract |
| --- | --- | --- |
| 1 | Cardamon | Brown. |
| 2 | Coriander | Do. |
| 3 | Caraway | Do. |
| 4 | Nutmeg | Deep brown. |
| 5 | Allspice | Do. |
| 6 | Cumin | Do. |

In each case the characteristic spice flavor also was extracted. Such extracts are useful in dry-soluble seasonings by imparting additional flavor and natural spice coloring. In addition, the presence of PHAB solvent in the extract so employed prevents caking of the vehicular crystals, thus replacing glycerine or propylene glycol, used heretofore, for such function and for other purposes.

The effect of temperature is illustrated in the following series, as measured by color value: 50 grams of exhausted black pepper from an oleoresin extraction process is heated with 100 ml. of propylene glycol for the times and temperatures indicated in Table III. The liquid phase of the extraction was tested for color as described above.

*Table III*

| Temperature, °F. | Color of Extract | |
|---|---|---|
| | 1 Hr. | 2 Hrs. |
| 220 | 29 | 31 |
| 260 | 48 | 54 |
| 300 | 66 | 87 |
| 340 | 90 | 94 |

The effect of alkali is variable as indicated in the following two tables.

50 gms. of exhausted black pepper from an oleoresin extraction process and 100 ml. of propylene glycol were heated for 1 hour at 260° F. and the liquid extract tested for color as described for Table III. Where an alkaline agent is used as in Table IV the amount is .75 gm.

*Table IV*

| Alkali | pH of Extract | Color Value |
|---|---|---|
| None | 6.9 | 40.5 |
| Sodium Bicarbonate | 7.6 | 39.5 |
| Sodium Carbonate | 8.4 | 40.5 |
| Sodium Hydroxide | 8.5 | 43.5 |

In using 25 gm. of natural clove, 100 ml. of propylene glycol, for 1 hour at 260° F. and the same weight percentage based on spice, namely 1.5%, and testing the color in the same way, it appears that alkali-metal carbonates are favorable as shown below:

*Table V*

| Alkali: | Color value |
|---|---|
| None | 44 |
| Sodium bicarbonate | 60 |
| Sodium carbonate | 58 |
| Sodium hydroxide | 48 |

The following examples illustrate the invention.

EXAMPLE 1

25 lbs. of Madagascar clove, 100 lbs. of propylene glycol, 2 lbs. of sodium bicarbonate, are heated for 1 hour at 260° F., with some carbon dioxide released on the initial heating. The product is filtered while hot, and the residue washed with 10 lbs. of propylene glycol. The total volume of liquid, including washings, is 85 lbs. The liquid extract is deep brown in color, and highly spiced with clove extract.

EXAMPLE 2.—DRY SOLUBLE CLOVE SEASONING

The PHAB extract as obtained in the processing of Example 1, is used to fortify colorless oil of clove, as by combining the two in the presence of a carrier for a dry soluble seasoning, thus:

| | |
|---|---|
| Corn sugar crystals lbs | 100 |
| Oil of clove pints | 5 |
| PHAB extract of Example 1 do | 3 |

EXAMPLE 3

100 lbs. of exhausted black pepper from an oleoresin extraction, and 200 lbs. of propylene glycol are heated for 1 hour at 300° F. The hot suspension is filtered and the residue washed twice with 25 lb. portions of propylene glycol. A yield of 175 lbs. of liquid was obtained. The color value of the extract (test under Table III) is 45. Dilution with water yields soluble color, but on adjusting to pH of 7 or less, color material is precipitated.

EXAMPLE 4

25 lbs. of natural clove, 100 lbs. propylene glycol, and 0.5 lb. of sodium bicarbonate, were heated for 2 hours at 300° F. to 320° F. After vacuum filtration the residue was washed with 10 lbs. of propylene glycol. The yield of filtrate and washings was 90 lbs. By diluting 0.1 gm. to 25 ml. and reading on a Fisher Electrophotometer with the 525 B filter, the color value was 23.5. The extract is highly spiced with clove extractives. By evaporating away the volatiles (including solvent and spice oils) in an oven at 100° C. to constant weight, the solids content of the original extract plus washings was determined to be 7.0% calculating to a figure in excess of 25% of extractives not including the spice oils volatilized in the analysis described.

EXAMPLE 5

50 lbs. of exhausted black pepper from a process of extracting oleoresins with a low-volatile hydrocarbon oil-solvent, were heated with 100 lbs. of propylene glycol for three hours at 300° F. to 320° F. The residue after filtration was washed with 15 lbs. of propylene glycol, giving a yield of filtrate and washings amounting to 80 lbs. The color value, determined as in Example 4, was 22.

As described under Example 4, it was found that the non-volatile solids extracted from the spice was 8.1% of the recovered liquid PHAB extract, indicating a yield well above 15% of the spice used which had already been treated for removal of essential oil and oleoresin.

EXAMPLE 6

The PHAB extract as recovered in Example 5 is useful in dry soluble seasoning to fortify oleoresin of black pepper, thus:

| | Pounds |
|---|---|
| Corn sugar crystals | 100 |
| Oleoresin of black pepper | 3 |
| PHAB extract of Example 5 | 2 |

*Water-dilution*

In Example 4 the pH of the clove extract when diluted with water is 8, and on acidification to pH 6 a brown precipitate flocculates. In Example 5 the pH of the extract is around 6 and the addition of water immediately precipitates a brown color, which dissolves again if the pH is raised to 7.5 to 8.0.

Although the process has been described in terms of using a certain class of water-miscible solvents, such limitation makes the description applicable to all the illustrated uses and steps of the invention. Where the solvent is employed on residues lacking in the essential oil of the spice, such as residues 17 and 23, and then completely vaporized away from the spice extract therein, it is apparent that any solvent including water may be used which is selective of spice values remaining in the spice residue so treated. The values so obtainable vary in character over a wide range according to the spice and the previous treatment, and include coloring agents, condiments, and antioxidants.

Suitable volatile solvents other than PHAB for extracting oil-free residues, are available in great number, including water.

Using such a solvent, at its reflux temperature at atmospheric pressure, for one hour, on an oil-free residue, gives a second and an oil-less extract for various uses, especially for fortifying an oil-containing extract. The following examples illustrate:

EXAMPLE 7

After extracting oleoresin from black pepper with hexane, in the manner described, the exhausted residue is used as spice material for a second extraction, using four parts of solvent for one part of spice material. The solvent was voltatilized away by distillation or evaporation, all as set forth in the following Table VI:

*Table VI*

| Example No. | Solvent | Per cent of Spice Extracted | Color Value Per Standard) |
|---|---|---|---|
| 7a | Water | 23.0 | 33.0 |
| 7b | Ethyl Lactate | 6.5 | 45.0 |
| 7c | Furfuryl Alcohol | 11.8 | 19.5 |

EXAMPLE 8

After extracting sage with hexane, the exhausted residue was extracted with a second solvent using ten parts of solvent per one part of residue. The solvent was volatilized away by distillation and oven drying for weight determination, with results as in Table VII.

*Table VII*

| Example No. | Solvent | Per cent of Spice Extracted | Color Value (Per Standard) |
|---|---|---|---|
| 8a | Water | 26.0 | 5 |
| 8b | Furfuryl Alcohol | 24.8 | 8 |

The invention is subject to numerous changes and modifications without departing from the spirit and scope of the invention as set forth in the appended claims.

We claim:

1. The method of treating natural spice to secure extractives therefrom, which comprises subjecting natural spice to the extracting action of a volatile solvent for the oil and oleoresin content of the spice, which solvent is readily separable by distillation from the volatile content of the spice oil dissolved therein to provide oleoresin extract substantially solvent-free, subjecting the residual solid spice material from said first-mentioned extraction to the extracting action of solvent selected from the group consisting of water-miscible polyhydric aliphatic alcohols and their water-miscible mono-ethers with monohydric aliphatic alcohols from methyl through butyl, whereby to dissolve non-volatile spice elements soluble in said solvent, separating by distillation the solvent in the resulting solution from the non-volatile spice elements dissolved therein, and fortifying an oleoresin extract of the same kind of natural spice with spice elements deriving from said spice material in said second extraction.

2. The method of treating natural spice to secure extractives therefrom, which comprises subjecting natural spice to the extracting action of a volatile solvent for the oil and oleoresin content of the spice, which solvent is readily separable by distillation from the volatile content of the spice oil dissolved therein to provide oleoresin extract substantially solvent-free, subjecting the residual solid spice material from said first-mentioned extraction to the extracting action of solvent selected from the group consisting of water-miscible polyhydric aliphatic alcohols and their water-miscible mono-ethers with monohydric aliphatic alcohols from methyl through butyl, whereby to dissolve non-volatile spice elements soluble in said solvent, separating by distillation at least some of the solvent in the resulting solution from the non-volatile spice elements dissolved therein by distillation thereby to provide a spice concentrate, and fortifying an oleoresin extract of the same kind of natural spice with spice concentrate deriving from said spice material in said second extraction.

3. The method of treating natural spice to secure extractives therefrom, which comprises subjecting natural spice to the extracting action of a volatile solvent for the oil and oleoresin content of the spice, which solvent is readily separable by distillation from the volatile content of the spice oil dissolved therein to provide oleoresin extract substantially solvent-free, subjecting the residual solid spice material from said first-mentioned extraction to the extracting action of solvent selected from the group consisting of water-miscible polyhydric aliphatic alcohols and their water-miscible mono-ethers with monohydric aliphatic alcohols from methyl through butyl, whereby to dissolve non-volatile spice elements soluble in said solvent thereby to provide a solution of spice elements, and fortifying an oleoresin extract of the same kind of natural spice with said solution of spice elements.

4. The method of treating natural spice to secure extractives therefrom, which comprises subjecting natural spice to the extracting action of a volatile solvent for the oil and oleoresin content of the spice, which solvent is readily separable by distillation from the volatile content of the spice oil dissolved therein to provide oleoresin extract substantially solvent-free, subjecting the residual solid spice material from said first mentioned extraction to the extracting action of propylene glycol, whereby to dissolve non-volatile spice elements soluble therein, separating by distillation the propylene glycol in the resulting solution from the non-volatile spice elements dissolved therein, and fortifying an oleoresin extract of the same kind of natural spice with spice elements deriving from said spice material in said second extraction.

5. The method of treating natural spice to secure extractives therefrom, which comprises subjecting natural spice to the extracting action of a volatile solvent for the oil and oleoresin content of the spice, which solvent is readily separable by distillation from the volatile content of the spice oil dissolved therein to provide oleoresin extract substantially solvent-free, subjecting the residual solid spice material from said first-mentioned extraction to the extracting action of propylene glycol, whereby to dissolve non-volatile spice elements soluble therein, separating by distillation at least some of the propylene glycol in the resulting solution from the non-volatile spice elements dissolved therein thereby to provide a spice concentrate, and fortifying an oleoresin extract of the same kind of natural spice with spice concentrate deriving from said spice material in said second extraction.

6. The method of treating natural spice to secure extractives therefrom, which comprises subjecting natural spice to the extracting action of a volatile solvent for the oil and oleoresin content of the spice, which solvent is readily separable by distillation from the volatile content of the spice oil dissolved therein to provide oleoresin extract substantially solvent-free, subjecting the residual solid spice material from said first-mentioned extraction to the extracting action of propylene glycol, whereby to dissolve nonvolatile spice elements soluble therein, thereby to provide a solution of spice elements, and fortifying an oleoresin extract of the same kind of natural spice with said solution of spice elements.

7. The method of treating spice material selected from the group consisting of natural clove, natural allspice, and residues of such spices from which the essential oil has been removed, which comprises subjecting the selected spice material in the presence of added alkali for one to two hours at a temperature upwardly from 212° F. to 340° F. to the extracting action of solvent selected from the group consisting of water-miscible polyhydric aliphatic alcohols and their water-miscible mono-ethers with monohydric alcohols from methyl through butyl, whereby to dissolve spice values including color, the presence of the alkali serving to enhance the color value of the extract.

8. The method of treating spice material selected from the group consisting of natural clove, natural allspice, and residues of such spices from which the essential oil has been removed, which comprises subjecting the selected spice material in the presence of added alkali for one to two hours at a temperature upwardly from 212° F. to 340° F. to the extracting action of solvent selected from the group consisting of water-miscible polyhydric aliphatic alcohols and their water-miscible mono-ethers with monohydric alcohols from methyl through butyl, whereby to dissolve spice values including color, the presence of the alkali serving to enhance the color value of the extract, and diluting the colored extract with water at a pH from 7 downwardly whereby to precipitate a brown coloring matter derived from spice.

9. A solvent extract of substantially oil-free spice residue consisting essentially of solvent selected from the group consisting of water-miscible polyhydric alcohols and their water-miscible mono-ethers with monohydric alcohols from methyl through butyl, and of non-oily spice content soluble in said solvent.

10. A solvent-free extract of substantially oil-free spice residue consisting of non-oily spice content soluble in a solvent selected from the group consisting of water-miscible polyhydric alcohols and their water-miscible mono-ethers with monohydric alcohols from methyl through butyl.

11. A solution of spice values comprising as solvent water-miscible solvent selected from the group consisting of polyhydric aliphatic alcohols and their water-miscible ethers with monohydric aliphatic alcohols from methyl through butyl, and as solute spice values deriving from spice material selected from the group consisting of oil-free natural spice and oleoresin-free natural spice.

LOUIS SAIR.
LLOYD A. HALL.

REFERENCES CITED

The following references are of record in the file of this patent:

UNITED STATES PATENTS

| Number | Name | Date |
| --- | --- | --- |
| 1,384,681 | Smith et al. | July 12, 1921 |
| 2,079,415 | Levinson | May 4, 1937 |
| 2,180,932 | Stockelbach | Nov. 21, 1939 |